United States Patent [19]
Ganapathy et al.

[11] Patent Number: 6,112,285
[45] Date of Patent: Aug. 29, 2000

[54] METHOD, SYSTEM AND COMPUTER PROGRAM PRODUCT FOR VIRTUAL MEMORY SUPPORT FOR MANAGING TRANSLATION LOOK ASIDE BUFFERS WITH MULTIPLE PAGE SIZE SUPPORT

[75] Inventors: Narayanan Ganapathy, San Jose; Luis F. Stevens, Milpitas; Curt F. Schimmel, San Ramon, all of Calif.

[73] Assignee: Silicon Graphics, Inc., Mountain View, Calif.

[21] Appl. No.: 08/935,819

[22] Filed: Sep. 23, 1997

[51] Int. Cl.[7] .................................................. G06F 12/00
[52] U.S. Cl. ..................... 711/207; 711/206; 711/209; 711/205; 711/212; 711/203
[58] Field of Search ................................. 711/207, 206, 711/205, 203, 208, 209, 212

[56] References Cited

U.S. PATENT DOCUMENTS

| | | | |
|---|---|---|---|
| 4,577,274 | 3/1986 | Ho et al. .................................. | 364/200 |
| 5,058,003 | 10/1991 | White ...................................... | 364/200 |
| 5,101,485 | 3/1992 | Perazzoli, Jr. ........................... | 395/400 |
| 5,446,854 | 8/1995 | Khalidi et al. .......................... | 395/401 |
| 5,465,337 | 11/1995 | Kong ...................................... | 395/417 |
| 5,727,178 | 3/1998 | Pletcher et al. ......................... | 711/207 |
| 5,873,127 | 2/1999 | Harvey et al. .......................... | 711/206 |

OTHER PUBLICATIONS

Hennessy and Patterson, *Computer Architecture: A Quantitative Approach*, 2nd Ed., pp. ix–xii, 439–457 and 634–760, Morgan and Kaufman Publishing, USA 1996.

Schimmel, *UNIX System for Modern Architectures: Symmetric Multiprocessing and Caching for Kernel Programmers*, Addison–Wesley Professional Computing Series, 1994, pp. vii–xiv, 5–12 and 59–81.

Khalidi et al., "Virtual Memory Support for Multiple Page Sizes", Sun MicroSystems Laboratories, Inc., Sep. 1993.

Romer et al., "Reducing TLB and Memory Overhead Using Online Superpage Promotion", *Proceedings of the 22nd Annual International Symposium on Computer Architecture*, 1995.

Talluria, Madhusudhan and Mark D. Hill, "Surpassing the TLB Performance of Superpages with Less Operating System Support", *Proceedings of the Sixth International Conference on Architectural Support for Programming Languages and operating Systems*, Oct. 1994.

Talluri et al., "A New Page Table for 64–bit Address Spaces", *Proceedings of SOSP 1995*.

Goodheart, B. and Cox, J., *The Magic Garden Explained: The Internals of UNIX® System V Release 4, An Open Systems Design*, Prentice–Hall, 1994, pp. 69–140.

(List continued on next page.)

*Primary Examiner*—Eddie P. Chan
*Assistant Examiner*—Kimberly McLean
*Attorney, Agent, or Firm*—Sterne, Kessler, Goldstein & Fox PLLC

[57] ABSTRACT

A system, method and computer program product for virtual memory support for TLBs with multiple page sizes that require only minor revisions to existing operating system code and remains compatible with existing applications. The virtual memory support provided herein is transparent to many existing operating system procedures and application programs. Various page sizes such as 4 KB, 64 KB, 256 KB, 1 MB, 4 MB and 16 MB page sizes can be used by application programs and each process can use multiple page sizes. Base page sized PTEs and data structures associated with physical pages (PFDATs) are maintained. Maintaining PFDATs and PTEs at a base page level facilitates upgrading and downgrading of memory pages. In addition, different processes can have different views of the same data. Support is provided for upgrading and downgrading memory pages. Examples of operating system methods that can be used for virtual memory support for multiple page sized TLBs are provided herein. Such examples include downgrading and upgrading memory pages, large page faulting and prefaulting, large page validation and page table entry setup.

6 Claims, 14 Drawing Sheets

OTHER PUBLICATIONS

Talluri et al. "Virtual Memory Support for Multiple Pages", Sep. 1993.

Romer et al., "Reducing TLB and Memory Overhead Using SuperPage Promotion", Proceedings of the 22nd Annual International Symposium on Computer Architecture, Dec. 1995.

Talluri et al., "Surpassing the TLB Performance of Super-Pages with Less Operating System Support", Proceedings of the Sixth International Conference on Architectural Support for Programming Languages and Operating Systems, Oct. 1994.

Talluri et al., "A New PAge Table for 64–bit Address Spaces", Proceedings of SOSP Dec. 1995.

(CONVENTIONAL APPROACH)

FIG. 5

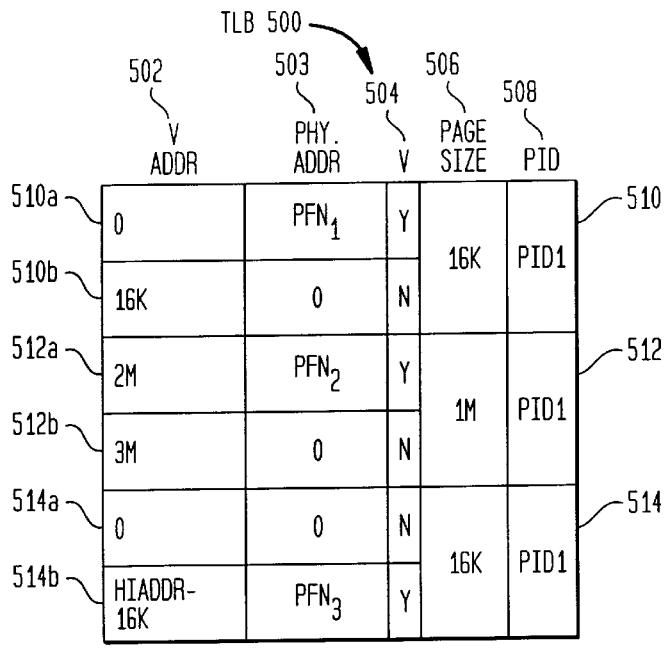

FIG. 6

```
602  pagesize_downgrade_algorithm(virtual_address,current_page_size)
603  {
604        even_aligned_virtual_address=(virtual_address &
605                                        ~(2*current_page_size -1));
606        num_base_pages=current_page_size/base_page_size;
607        pte = get_page_table_entry(even_aligned_virtual_address);
608
609        for (i = 0; i < 2*num_base_pages; i++, pte++)
610              invalidate pte;    /* clear the hardware valid bit*/

611        flush tlb entries mapping current process;

612        for (i = 0; 1 < 2*num_base_pages; i++, pte++) {
613              pte.page_size=base_page_size;
614              if (previously valid)
615                    validate pte;
616        }
617  }
```

FIG. 7

```
702  pagesize_upgrade_algorithm(virtual_address, large_page_size)
703  {
704        even_aligned_virtual_address =
705              (virtual_address & ~(2*large_page_size -1)); /*get even aligned virtual address from
706                                                             any address that falls within the large page */
707        num_base_pages = large_page_size/base_page_size;
708        pte = get_page_table_entry(even_aligned_virtual_address);
709
710        /*
711         * Scan the page table entries for the odd/even tlb entries of the
712         * large page and invalidate them.
713         */
714        for (i = 0; i < 2*num_base_pages; i++, pte++) {
715              invalidate pte;
716              /* clear hardware valid bit */
717        }
718
719        even_new_pfdat = large_page allocate a page with large_page_size;
720        odd_new_pfdat = large_page allocate a page with large_page_size;
721        flush tlb entries mapping only the current process;
722
723        new_pfdat = even_new_pfdat;
724        num_page_scanned = 0;
725
726        for(i = 0; i < 2*num_base_pages; i++, pte++) {   /* go through page table entries and migrate data
727                                                            /* associated with valid entries */
728              if(pte has a non zero PFN) {               /* Check if pte is valid, i.e. contains a valid PFN
728                                                            */
729                    current_pfdat = ptetopfdat(pte);
730                    migrate current_pfdat to new_pfdat;
731              }
732              num_page_scanned++;
733              if(num_page_scanned == num_base_pages) {   /* done with even segment? */
734                    new_pfdat = odd_new_pfdat;
735                    num_page_scanned = 0;
736              }else
737                    new_pfdat = new_pfdat + 1;           /* Next pfdat of large page */
738        }
739
740        pte = get_page_table_entry(even_aligned_virtual_address);
741        for(i = 0; i < 2*num_base_pages; i++, pte++) {  /* go through page table and update page size */
                    pte.page_size = large_page_size;
             }
742  }
```

FIG. 8A

```
801  /* large page fault method */
802  page_fault(fault_vaddr)
803  {
804        p = get process table entry for current process;
805        vaddr = get aligned fault_vaddr to base_pagesize boundary;
806        page_fault_policy = get_page_fault_policy(p, vaddr);
807        if(page_fault_policy directs us to use large page) {
808              page_size = get_page_size(page_fault_policy);
809              if(large_page_validate(vaddr, page_size)!=SUCCESS)
810                    page_size = base_page_size;
811        }
812
813        memory_object = get_memory_object(p, vaddr);
814        pte = get_page_table_entry(p, vaddr);
815
816        memory_object_offset = get_memory_object_offset(p, vaddr, memory_object);
817              /* get the offset into the memory object for the faulting address */
818              /*                                                                 */
819        if(page_size>base_page_size)&&(large_page_prefault(pte, vaddr, memory_object,
820        memory_object_offset, page_size, fault_info) == SUCCESS) {
821              npgs = page_size/base_page_size;
822              vaddr = get aligned fault_vaddr to page_size boundary;
823        } else
824              npgs = 1;
825
826        for (i = 0; i < npgs; i++, pte++) {
827              search memory object's cache to check if a physical
828                    page already maps the memory_object at
829                    memory_object_offset;
830              if(search successful) {
831                    pfdat = physical page that maps memory_object at
832                          memory_object_offset;
833                    if(page not ready)
834                          wait for page to be ready;
835
836                    setup_page_table_entry(pfdat, pte, page_size);   /* Set up page table mapping */
837
```

FIG. 8B

```
838        } else if(data corresponding to memory_object
839               at memory_object_offset is in swap device) {
840
841               if(fault_info has pfdat) {        /* if large_page_prefault has already    */
842                      pfdat = fault_info.pfdat;  /* allocated a large page a use the      */
843                      fault_info.pfdat =         /* corresponding base size pfdat         */
844                            fault_info.pfdat + 1;/* inside the large page. Also bump      */
845                                                 /* the fault_info.pfdat pointer to poi   */
846                                                 /* to the next pfdat of the large page.  */
847               } else
848                      pfdat = allocate new physical page;
849
850               insert pfdat into memory_object_cache
851                      at memory_object_offset;
852               read data from the swap device to page implied
853                      by pfdat;
854               mark page ready;
855               setup_page_table_entry(pfdat, pte, page_size);

856        } else if(data corresponding to memory_object
857               at memory_object_offset is in a disk file) {
858
859               if(fault_info has pfdat) {        /* large_page_prefault has already       */
860                      pfdat = fault_info.pfdat;  /*allocated a large page use the         */
861                      fault_info.pfdat =         /* corresponding base page size pfdat    */
862                            fault_info.pfdat+1;/* inside the large page. Increment the    */
863                                                 /* fault_info.pfdat pointer to the next  */
864                                                 /* pfdat of the large page.              */
865
866               } else
867                      pfdat = allocate new physical page;
868               insert pfdat into memory_object_cache
869                      at memory_object_offset;
870               ask file system to read file data into page implied
871                      by pfdat;
872               mark page ready;
873               setup_page_table_entry(pfdat, pte, page_size);
874
```

FIG. 8C

```
875             } else if(new page needs to be set up) {
876                     if(fault_info has pfdat) {
877                             pfdat = fault_info.pfdat;
878                             fault_info.pfdat=fault_info.pfdat+1;
879                     } else
880                             pfdat = allocate new physical page;
881                     insert pfdat into memory_object_cache at
882                             memory_object_offset;
883                     zero the page implied by pfdat;
884                     mark page ready;
885                     setup_page_table_entry(pfdat, pte, page_size);
886             }
887     }
888
889     /* After the entire large page has been faulted set the valid
890        bits in the page table entry. */
891
892     pte = get_page_table_entry(p, vaddr);   /* After the entire large page has been faulted    */
893     for (i = 0; i < npgs; i++, pte++)       /* set the valid bits in the page table entry     */
894             pte.valid = TRUE;
895     dropin one tlb entry;
896 }

```
902  page_modify_fault(fault_vaddr)
903  {
904      p = get process table entry for current process;
905      vaddr = align fault_vaddr to base_pagesize boundary;
906      pte = get_page_table_entry(p, vaddr);
907      page_fault_policy = get_page fault_policy(p,vaddr);
908      if(page_fault_policy directs us to use large page) {
909          page_size = get_page_size(page_fault_policy);
910          if(large_page_validate(vaddr, page_size) !=SUCCESS)
911              page_size = base_page_size;
912      }
913      if(page_size !=base_page_size) {
914          if(copy-on-write memory segment(p, vaddr) &&
915                      copy_needed) {
916              even_aligned_address = vaddr & ~(2* page_size - 1);
917              odd_aligned_address = even_aligned_address + page_size;
918              large_page_pfd = allocate a large page;
919              if(allocation fails) {
920                      down grade large pages at even_aligned_address
921                              and odd_aligned_address;
922                  page_size = base_page_size;
923              }
924          }
925      }
926
```

FIG. 9B

```
927     npgs = page_size/base_page_size;
928     for (i = 0; i < npgs; i++, pte++) {
929             if (not a copy-on-write memory segment(p, vaddr)) {
930                     mark pfdat dirty
931                     pte.mod = TRUE;
932                     continue;
933             }

934             if (copy_needed) { /* Copy-on-write page and copy needed */
935                     if(large_page_pfd) {        /* A large page has been allocated */
936                             new_pfdat = large_page_pfd;
937                             large_page_pfd = large_page_pfd + 1;
938                     } else {
939                             new_pfdat = allocate a page of
940                                     base_page_size bytes;
941                     }
942                     current_pfdat = get pfdat from pte;
943                     copy the data in the page implied by current_pfdat to
944                             the page implied by new_pfdat;
945                     insert new_pfdat into the memory object cache;
946                     setup_page_table_entry(new_pfdat, pte, page_size);
947             }
948             pte.mod = TRUE;
949     }

950     pte = get_page_table_entry(p, vaddr);
951             drop pte into the TLB for fault_vaddr;
952 }

```
/*
 * Sets up the page table entries. It does not validate the page.
 */
setup_page_table_entry(pfdat, pte, page_size)
{
        pfn = pfdattopfn(pfdat);
        pte. pfn = pfn;  /* Make pte point to the physical page. */
        pte. page_size = page_size;
        insert pte into the reverse map of pfdat;
}
```

FIG. 11

```
/*
 * Do checks to see if a large page can be faulted in for a given region.
 */
large_page_validate(pte, vaddr, page_size)
{
        even_aligned_address=vaddr & ~(2*page_size - 1);
        odd_aligned_address=even_aligned_address + page_size;

if the virtual address range [even_aligned_address,
                odd_aligned_address + page_size)) is not in the
                same memory segment
                        return FAILURE;

if the pages in the virtual address range [even_aligned_address,
                odd_aligned_address + page_size)) do not have
                the same protections or cache attributes
                return FAILURE;

if the virtual address range [even_aligned_address,
                odd_aligned_address + page_size)) does not have
                the same page_fault policy
                return FAILURE;

return SUCCESS;
}
```

FIG. 12

```
1202  large_page_prefault(pte, vaddr, memory_object, memory_object_offset,
1203                     page_size, fault_info)
1204  {
1205      even_aligned_address = vaddr & ~(2*page_size - 1);
1206      odd_aligned_address = even_aligned_address + page_size;
1207      npgs = page_size/base_page_size;
1208      scan all the ptes for the virtual address range
1209              [even_aligned_address, even_aligned_address + 2*page_size);
1210      if ((a large page of page_size bytes maps even_aligned_address or
1211              odd_aligned_address) ||
1212              (no pages map the address range [even_aligned_address,
1213                     even_aligned_address + 2*page_size])) {
1214          search the memory object cache if data for the
1215          memory object in the range [memory_object_offset,
1216                  memory_object_offset + npgs);
1217          if(the data in the range[memory_object_offset,
1218          memory_object_offset + npgs) is all in memory
1219                  object cache and they are contiguous and aligned
1220                  at page_size)
1221                  return SUCCESS;
1222          if(none of the the data in the range[memory_object_offset,
1223          memory_object_offset + npgs) is in cache)
1224                  pfdat = allocate a page of page_size bytes;
1225                  if(allocation is not successful)
1226                          goto fail;
1227                  store a pointer to that pfdat in fault_info;
1228                  return SUCCESS;
1229          if(all the data in the range[memory_object_offset,
1230          memory_object_offset + npgs) is all in swap device)
1231                  pfdat = allocate a page of page_size bytes;
1232                  if(allocation is not successful)
1233                          goto fail;
1234                  store a pointer to that pfdat in fault_info;
1235                  return SUCCESS;
1236      }
1237  fail:
1238      if(a large page of page_size bytes maps even_aligned_address or
1239      odd_aligned_address)
1240              downgrade that large page to a set of base pages;
1241      return FAILURE;
1242  }
1243
```

METHOD, SYSTEM AND COMPUTER PROGRAM PRODUCT FOR VIRTUAL MEMORY SUPPORT FOR MANAGING TRANSLATION LOOK ASIDE BUFFERS WITH MULTIPLE PAGE SIZE SUPPORT

BACKGROUND OF THE INVENTION

1. Field of the Invention

The present invention relates generally to memory management in a computer system and more particularly to a system, method, and computer program product for virtual memory support for managing translation look aside buffers that support multiple page sizes.

2. Related Art

As the speed and capacity of computer hardware systems continue to increase, so have the demands of application programs that run on them. Recently, a new breed of application programs have emerged that require huge amounts of main memory during execution. For example, it is not unusual for database and data mining applications to demand thousands of megabytes of memory allocation during program execution.

Generally, most operating systems manage memory in terms of individual memory pages. More specifically, memory in the computer system is divided into a number of memory pages. Such memory pages historically have had a fixed size such as 4 or 16 Kilobytes (KB) per page. Accordingly, when an application program requests a specific amount of memory during program execution, a particular number of memory pages are reserved for that purpose.

For example, in a system with 16 KB memory pages, when an application program requests 256 KB of memory, the operating system reserves 16 pages of physical memory for the process making the request.

Once a memory page is allocated for a particular process, an entry is added to a page table. Generally, each process has an associated page table, although this may not be the case in all systems. The page table entry maps a physical memory page to the virtual address space associated with the process. Accordingly, when the process needs to access the allocated memory page, the page table entry is consulted to find the corresponding physical address for the requested memory page.

In order to increase overall system performance, most computer systems employ a cache system for frequently and or most recently used page table entries (PTEs). One example of such a cache system is a translation look aside buffer (TLB). TLBs are generally implemented in hardware and comprise information similar to that in the page table. That is, like the page table, TLBs are used to map the virtual address of memory pages to the physical address of memory pages. Because the TLBs are implemented in hardware, address translations are generally much faster than translations using page tables, which are generally implemented in software.

Accordingly, many computer systems maintain translations associated with the most recent and/or the most frequently accessed memory pages in TLBs. As such, whenever a process needs to access a memory page, the system-wide TLB is searched first. The much slower process of searching (or "walking through") the page table is performed only when the desired translation is not found within the TLB.

When an address translation is found within the TLB, a TLB cache hit or more simply, a TLB hit occurs. When an address translation is not found within the TLB, and the system must resort to a page table walk-through, a TLB miss occurs. For increased system performance it is clearly desirable to minimize TLB misses and maximize TLB hits.

However, because the TLB is implemented in hardware, it generally has a limited capacity that cannot be changed. For example, a MIPS R10000 RISC microprocessor, manufactured by MIPS Technology, Inc., has a capacity of 64 TLB entries, wherein each TLB entry comprises 2 subentries. The subentries are related to one another in that they map adjacent virtual memory pages of the same size. Thus, at most, such a TLB has a capacity to store 128 page translations. For a system that defines fixed sized 16 KB memory pages, this translates into a TLB range of 16 KB*128, or 2 megabytes (2 MB).

For applications requiring a large amount of memory pages, the TLB can quickly become exhausted thereby causing an inordinate amount of TLB misses. For example, suppose during program execution, a large database program allocates a total of 10 MB of memory. This translates into 640 16 KB memory pages. In a system with a TLB capacity of 128 entries, at most, access to 128 pages would generate a TLB hit and access to the remaining 512 pages would generate TLB misses. Thus for such applications serious performance problems are known to occur.

In order to alleviate such performance problems it is desirable to increase the page size for certain applications, such as large database programs and the like. These programs typically have large working data sets comprising multiple database tables, indexes and the like.

Having a large page size defined for such applications can cause a significant increase to overall system performance. First, large size pages significantly reduces the number of page faults an application has to go through to initially get its working data set in memory. For example, if a system or virtual system (VM) supports a 1 MB page size, then an application having a 10 MB data size would just need 10 page faults instead of 640 (for a system with a 16 KB page size) to get its working set into memory.

Second, large size pages significantly reduces the number of TLB misses during program execution. For example, in a virtual machine that supports a 1 MB page size, an application having a 10 MB data size would require only 10 TLB entries for the entire 10 MB of memory. In contrast, for a VM that only supports a 16 KB page size, the entire TLB would be quickly exhausted (i.e. with the first 128 entries), thereby causing TLB misses for the remaining 512 pages.

Recently, some microprocessors, such as the R10000, have included hardware support for large pages within the TLB. However, these improvements have remained largely untapped because current solutions propose that invasive operating system modifications that introduce considerable overhead are required to support TLBs with such large page sizes. That is, proposed solutions to date suggest that in order to support TLBs with large pages, major rewrites of the file system, the I/O subsystems and low level subsystems are required.

This is evidenced by a variety of papers written on the subject. Examples of such papers include: Madhusudhan Talluri, Mark D. Hill, Yousef A. Khalidi, "*A New Page Table for 64-bit Address Spaces*" appearing in Proceedings of SOSP' 1995; Yousef A. Khalidi, Madhusudhan Talluri, Michael N. Nelson, Dock Williams, "*Virtual Memory Support for Multiple Pages*", SMLI TR-93-17, September 1993; and Madhusudhan Talluri, Mark D. Hill, "*Surpassing the TLB Performance of Superpages with Less Operating Sys-* tem Support", appearing in the Proceedings of the Sixth International Conference on Architectural Support for Programming Languages and Operating Systems (ASPLOS VI), October 1994.

Thus, what is needed is a system, method and computer program product that provides virtual memory support at the operating system level for multiple page sizes, without major revisions of operating system code and without significant expense in terms of system performance.

SUMMARY OF THE INVENTION

Accordingly, the present invention provides virtual memory support for TLBs with multiple page size support. Further, the present invention can be implemented with only minor revisions to existing operating system code. An advantage of the present invention is that it provides such support without significant performance penalties. Further, the virtual memory support provided herein is transparent to many existing operating system procedures and existing application programs.

In a preferred embodiment, various page sizes such as 4 KB, 64 KB, 256 KB, 1 MB, 4 MB and 16 MB page sizes can be used by application programs. Further each process can use multiple page sizes. Preferably, a particular page size is associated with a particular range of virtual address space. For example in one embodiment, a user or an operating system may select large page sizes for areas of data that require large pages and may select a smaller page size for areas of data that require smaller pages.

As stated, an embodiment of the present invention can be implemented with only minor revisions to existing operating system code. This is accomplished in part, by maintaining page table entries (PTEs) and data structures associated with physical pages, at a base page size level. A base page size is defined as the smallest page size available for application programs. Typically, 4 KB or 16 KB is defined as a base page size. However, the present invention is not intended to be so limited as any page size and ranges of page sizes can be used. The actual base page size definition depends on each specific implementation of the present invention. For clarity, in the examples used herein, it is assumed that a 16 KB base page size is defined.

Accordingly, one PTE is maintained in each page table for each mapped base page sized memory segment. For example, a large page that is mapped as a 64 KB page is represented in the page table as four 16 KB base pages. Similarly, a large page that is mapped as a 256 KB page is represented in the page table as sixteen 16 KB base pages. In addition, a separate data structure is maintained for each base page sized memory segment. That is, for a system with a 16 KB page size, 4 data structures are maintained for a page defined as a 64 KB page and 16 data structures are maintained for a page defined as a 256 KB page.

In this fashion, support provided by the present invention for managing multiple page sized TLBs are transparent to many existing operating system procedures and application programs. Thus, only minor revisions of operating system code are needed to support multiple page sizes according to a preferred embodiment of the present invention. Further, application programs that are not aware of multiple page size support can benefit from the performance gains of using large pages sizes without modification. Alternatively, users can include specific support in their applications for multiple page sizes by using the methods disclosed herein. For example, a user can specifically request that certain memory pages be upgraded to large pages by using the methods provided herein.

By maintaining page frame data structures at the base page level makes it possible for different processes to have different views of the same data. That is, for example, one process may view data as a sixteen 16 KB pages, while another may view the same data as a single 256 KB page. Thus, for example, if a large memory page needs to be downgraded for a particular process, it is downgraded only for that process. Maintaining PTEs and page frame data structures at the base page level also facilitates upgrading and downgrading of memory pages.

The present invention provides support for upgrading and downgrading memory pages, in part, to maintain compatibility with existing application programs that may not be aware of large page size support. Downgrading memory pages may be needed for example in order to comply with TLB restrictions. For example, a typical TLB, such as the TLB in a MIPS R10000 microprocessor comprises 64 TLB entries, each having 2 subentries. The subentries are related to one another in that they must map adjacent virtual pages of the same size.

Accordingly, in a preferred embodiment, the present invention assures that the entry/subentry requirements of the TLB are maintained. For example, suppose a particular process maps a large memory page in one subentry, and subsequently attempts to map a base page sized memory page in the associated subentry. In this case, the entry/subentry restriction would be violated and cannot be maintained. Thus, in this example, the present invention transparently downgrades the large sized memory page in the first subentry to multiple pages of the base page size. In this fashion, the second mapping can then take place and the TLB restrictions are maintained.

In another example, suppose a process that maps a large memory page, such as the 1 MB memory page in a TLB subentry, and subsequently unmaps a portion of the page. This can happen, for example, because a process that is not large page size aware, may free an arbitrary section of memory within the 1 MB large page. Accordingly, in order to accommodate the free memory request, the present invention downgrades the 1 MB into sixty four 16 KB pages. Then the operating system is free to unmap any one or more base pages within the 1 MB range. Accordingly, the present invention maintains the requirements of the TLB, while at the same time, puts no restrictions on application programs.

Examples of operating system methods that can be used for virtual memory support for multiple page sizes are provided herein. In one example, a method for downgrading memory pages from a large page size to a base page size is presented. In another example, a method for upgrading memory pages from a base page size to a large page size is presented.

The use of base page sizes in these examples are used for exemplary purposes only. In fact, using the principles disclosed herein, it would be apparent to those skilled in the relevant art(s), how to upgrade from or downgrade to any page size between and including the largest page size and the base page size.

Specifically, the downgrade algorithm presented herein downgrades large pages to a plurality of base sized pages. Two adjacent pages are downgraded to maintain the entry/ subentry restrictions of the TLB as described above. The downgrade method updates each PTE associated with the adjacent large pages to reflect the downgraded base page size. In addition, the TLB associated with the large page is flushed.

The upgrade algorithm presented herein upgrades pages of the base page size into a pair of adjacent large pages. In the upgrade algorithm, a pair of adjacent large memory pages are allocated. Each relevant PTE is updated according to the large page size and the base page TLB entries associated with the current process is flushed. The upgrade method then migrates the base pages to the new area in memory comprising the newly allocated large pages.

A method that can be used to fault in large pages is also presented. The method performs a number of checks to be sure that a large page associated with the relevant virtual address space can be faulted in. Also presented herein is support for a page modify fault. This is used whenever a process attempts to modify a memory page associated with a file. The page modify fault keeps track of modified pages so that the operating knows which pages need to be written back to the file.

BRIEF DESCRIPTION OF THE FIGURES

The present invention is described with reference to the accompanying drawings, wherein:

FIG. 5 is a block diagram depicting a portion of a typical TLB according to a preferred embodiment of the present invention;

FIG. 6 depicts an example of a method in pseudo-code that can be used to downgrade memory pages according to a preferred embodiment of the present invention;

FIG. 7 depicts an example of a method in pseudo-code that can be used to upgrade memory pages according to a preferred embodiment of the present invention;

FIGS. 8A–8C depict an example of a method in pseudo-code that can be used for faulting in large memory pages of various sizes according to a preferred embodiment of the present invention;

FIGS. 9A and 9B depict an example of a method in pseudo-code that can be used for a page modify fault using large memory pages of various sizes according to a preferred embodiment of the present invention;

FIG. 10 depicts an example of a method in pseudo-code that can be used to set up a page table entry according to a preferred embodiment of the present invention;

FIG. 11 depicts an example of a method in pseudo-code that can be used for validating memory pages of various sizes according to a preferred embodiment of the present invention;

FIG. 12 depicts an example of a method in pseudo-code that can be used to implement a large page prefault for memory pages of various sizes according to a preferred embodiment of the present invention.

DETAILED DESCRIPTION OF THE PREFERRED EMBODIMENTS

The present invention provides support for large page sizes without having to incur major revisions of operating system code. Further, the present invention provides such support in an efficient manner without incurring significant performance penalties. The multiple page size support provided by the present invention is transparent to most currently existing operating system components and application programs that run on the operating system. As such, currently existing application programs can benefit from increased performance from using large page sizes without modification. Further, because the present invention is transparent to most existing operating system procedures, only a small amount of operating system modifications are required.

The present invention can be implemented in a variety of computer systems and environments, including, but not limited to, uni-processor computer systems, shared memory, symmetric multi-processing (SMP) systems and distributed shared memory (DSM) multi-processor systems. For example, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

In order to describe the details of the present invention, it is useful to first describe the relationship between virtual memory and physical memory in a typical computer system employing a virtual memory scheme.

As indicated above, the present invention can be embodied within an operating system. As such, the examples used herein refer to an operating system. This description is used for exemplary purposes only and to distinctly point out the details of the present invention. As such, these examples should not be construed to limit the scope and breadth of the present invention.

Typical modern operating systems generate data structures that represent physical memory pages. The data structures are also used to store additional information about each page of memory that it represents. These data structures can be implemented in a variety of ways and are referred to by a variety of names. For example, in Silicon Graphics' IRIX operating system, these data structures are referred to as page frame data structures, or PFDATs.

Throughout the remainder of this specification, the terms page frame data structure and PFDAT are used interchangeably to refer to data structures that represent pages of physical memory. Whenever the terms page frame data structure or PFDAT is used, it is to be understood that they are used in a broad sense and refer to any data structure that is employed to represent pages of physical memory.

Figure 1:
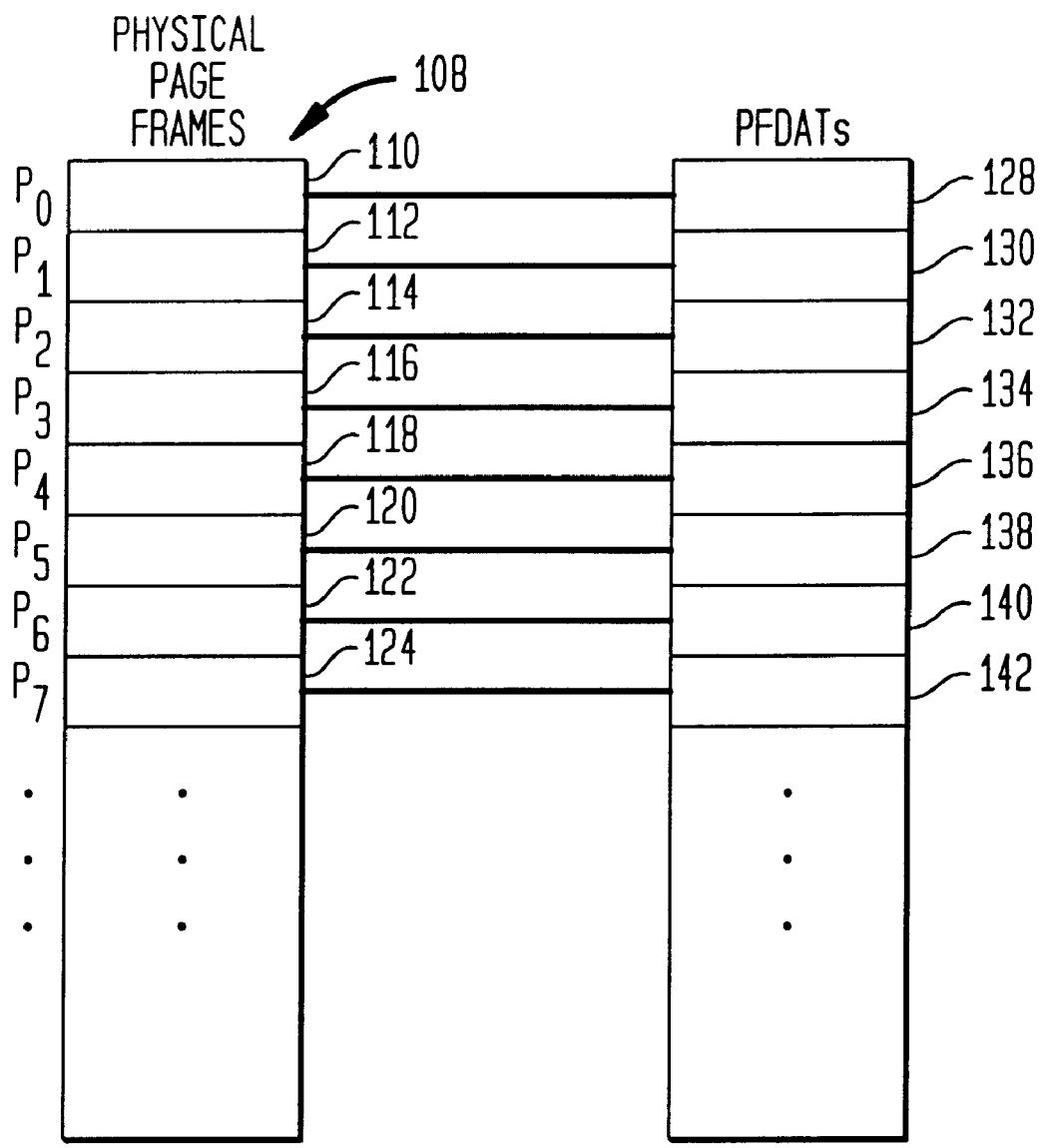
FIG. 1 is a block diagram depicting the relationship between a PFDAT and physical memory according to a preferred embodiment of the present invention.

Typical operating systems divide main memory into segments referred to as memory pages. FIG. 1 is a block diagram depicting the relationship between a PFDAT and physical memory. In FIG. 1, main memory 108 is divided into a number of page frames, or memory pages 110–124. In this example of a typical computer system, each memory page has a fixed size, such as 16 KB. Each memory page 110–124 is represented by a corresponding PFDAT 128–142, respectively. The operating system uses each PFDAT 128–142 to store information related to the associated memory page 110–124 and to locate the physical pages 110–124 represented by each PFDAT 128–142.

As stated, each PFDAT 128–142 typically stores information related to their associated memory page. For example, the PFDATs 128–142 can include fields for indicating whether data stored in the associated page of physical memory is clean or dirty. In multi-processor systems, or multi-threaded operating systems, PFDATs are generally shared by multiple processes. Accordingly, a PFDAT may contain information about a process or processes currently using the memory page associated with the PFDAT.

Single and multi-processor computer systems are typically capable of running multiple applications at a time or multiple instances of the same application at the same time. In order to accomplish this task, each application typically has an associated virtual address space. Thus, when an application references a particular memory page, the virtual address for the memory page is used. The operating system then translates or maps the virtual address to a physical address through the use of a page table.

Accordingly, two processes may reference the same virtual memory page but may actually access two different physical memory pages. Thus, processes using similar virtual addresses can operate in the same machine without interfering with each other's data. In fact, by using a virtual address scheme two or more instances of the same application program can be run on the same machine at the same time, each using different areas of physical memory.

By the same token, the operating system may permit sharing of data among processes when appropriate. For example, it is common for two or more processes to safely share the same copy of read-only data, library functions or the like. This saves memory in that there is no need to store duplicate copies of the same data. The use of virtual address memory mapping schemes as described above, is well known and would be apparent to persons skilled in the relevant art(s).

As stated, page tables are used to map virtual addresses to physical addresses. Each mapping is referred to as a page table entry (PTE). Typically, each PTE comprises a mapping for one page of memory.

Figure 2:
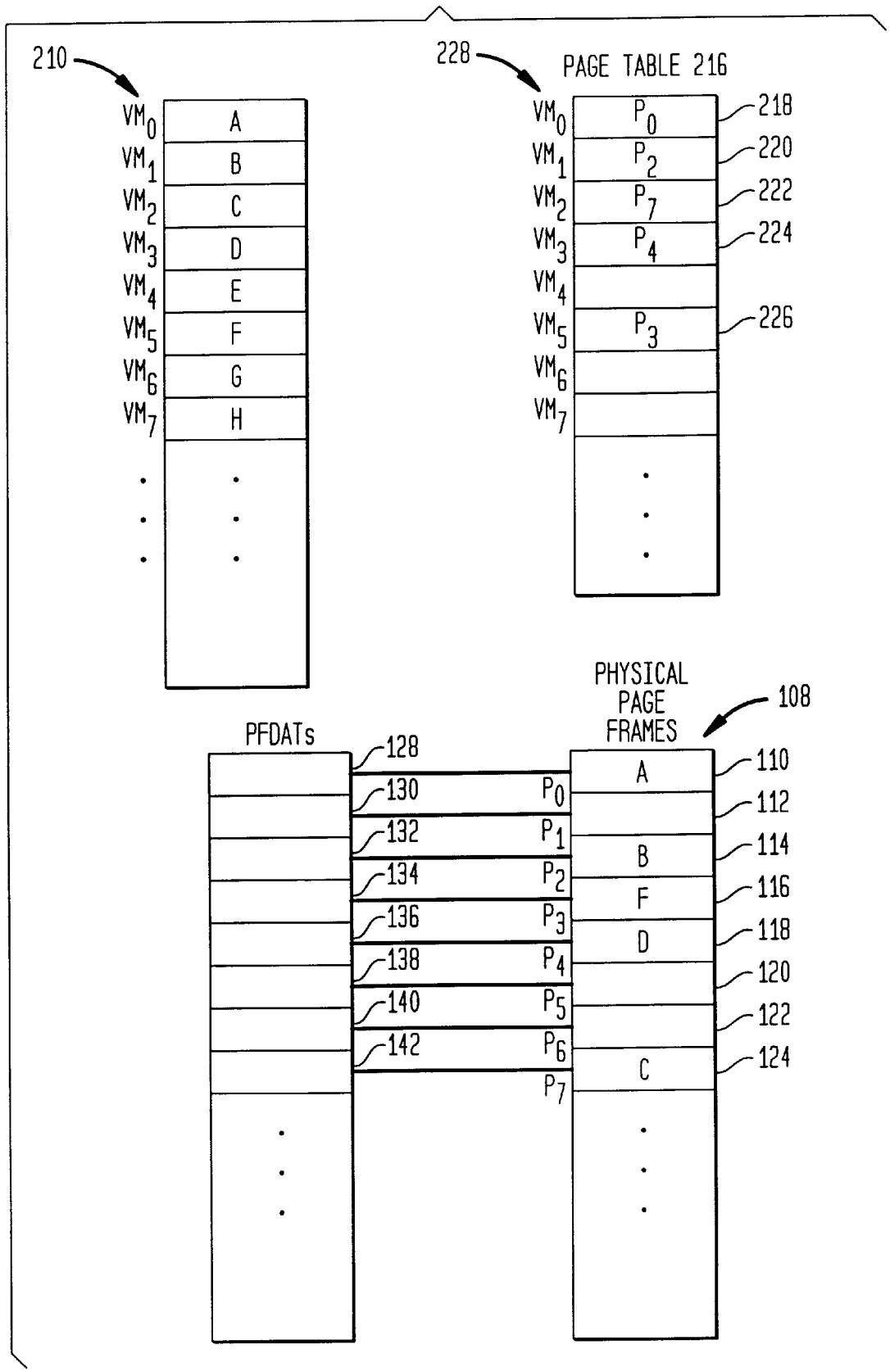
FIG. 2 is a block diagram depicting the relationship between virtual memory and physical memory, using a page table.

FIG. 2 is a block diagram showing the relationships among a virtual address space, a page table and physical memory pages (along with their associated PFDATs). In FIG. 2, a virtual memory mapping scheme is illustrated for the virtual addresses 210 ($VM_0$–$VM_7$), that are each used to store data A–H, respectively. As illustrated in the virtual address space 210, data "A" is associated with the virtual memory address $VM_0$, data "B" is associated with virtual memory address $VM_1$ and data "C" is associated with virtual address $VM_2$. Similarly, the data represented by "D", "E", "F", "G" and "H" are each associated with the virtual addresses $VM_3$, $VM_4$, $VM_5$, $VM_6$ and $VM_7$, respectively.

The page table 216 provides the translations between the virtual memory addresses 210 and the physical page frames 108. Typically each process has an associated page table, such as page table 216. Alternatively, some computer systems employ a common page table that is shared among all processes. Other systems share portions of page tables among processes. In these cases, each PTE may include a process identification tag (PID) to identify the process associated with the PTE. In the examples used herein, as in the preferred embodiment, each process has its own page table, such as page table 316.

Accordingly, the page table 216 includes a number a PTEs for each mapped page of virtual memory. Each PTE 218–226 references a physical page frame 110–124 that stores data for the associated virtual address 228. Each PTE 218–226 thus serves as a virtual memory address to physical memory address translation. The virtual addresses 228 can either be explicitly stored in each PTE 218–226 or impliedly indexed. For operating systems with fixed page sizes, it is common that such virtual addresses are implied. However, if an operating system supports multiple page sizes, virtual addresses are generally stored within each PTE 218–226. The PTEs are in any case indexed by the virtual address 210.

Accordingly, whenever a process needs a physical address for mapped data, and the translation is not contained in a translation look aside buffer (TLB) (described below), the page table associated with the process is searched according to a virtual address. If the data is mapped, the physical address in the page table entry is used to access the mapped data. Additional details of virtual memory management can be found in Goodheart and Cox, "*The Magic Garden Explained*," pp. 69–140, Prentice Hall, 1994, incorporated herein by reference.

The page table translations for the mapped data "A", "B", "C", "D" and "F" are depicted in FIG. 2. Accordingly, data "A" is mapped from virtual memory address $VM_0$ to page frame $P_0$ 110, via the PTE 218. Data "B" is mapped from virtual memory address $VM_1$ to page frame $P_2$ 114, via PTE 220. Data C is mapped from virtual memory address $VM_2$ to page frame $P_7$ 124, via PTE 222. Data "D" is mapped from $VM_3$ to $P_4$ 118, via 224. Finally, data "F" is mapped from $VM_5$ to $P_3$ 116, via PTE 226. Note that in this example, the data represented by "E", "G" and "H" are not currently mapped to physical page frames 106 and thus are not contained in the page table 216 for the example process (not shown).

Figure 3:
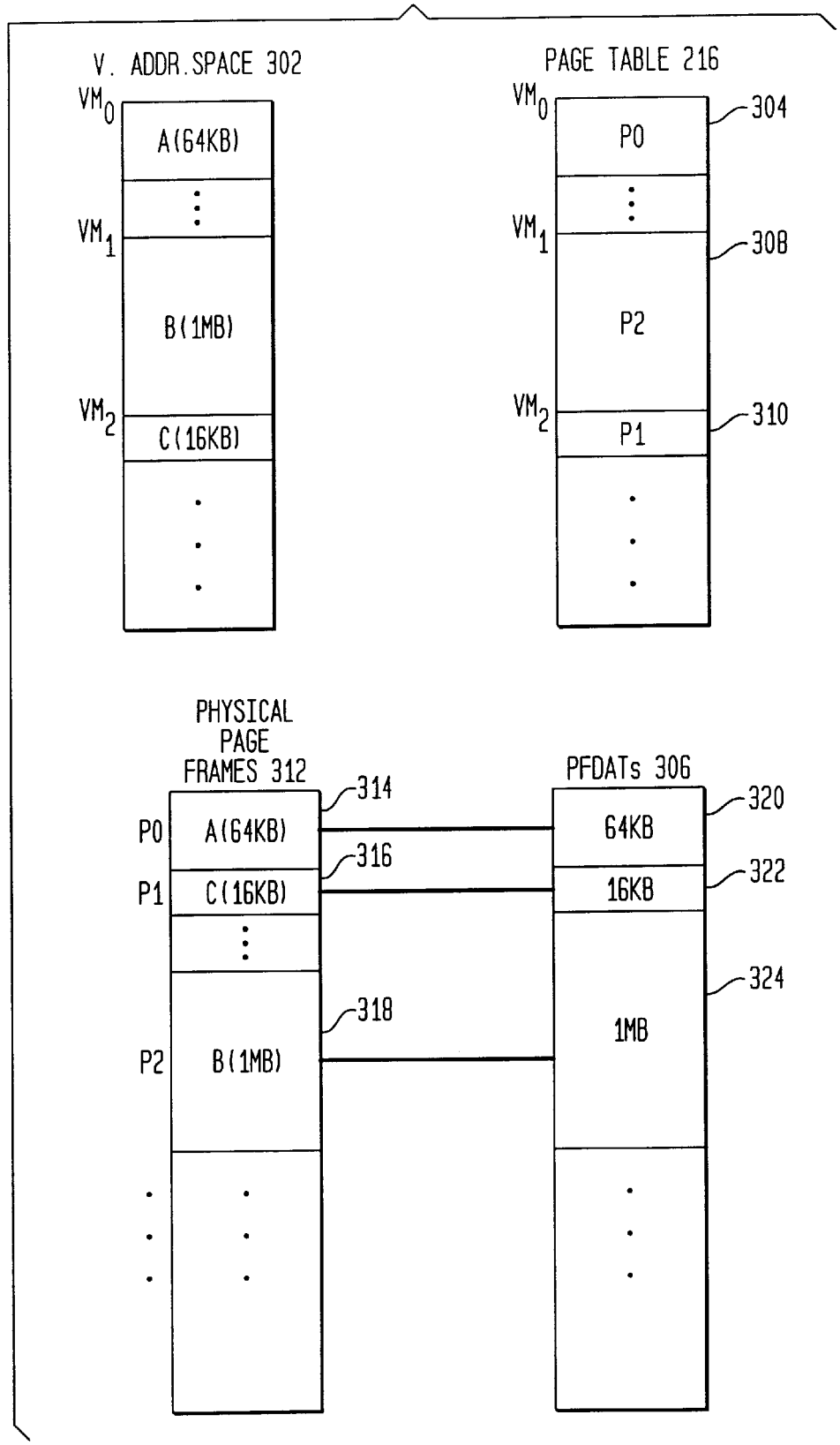
FIG. 3 is a block diagram depicting a virtual memory address space, a page table, a set of PFDATs and a set of physical page frames, used to show a typical approach that may be used to support large memory pages.

FIG. 3 is a block diagram depicting a typical approach that may be used to support large memory pages. Specifically, FIG. 3 illustrates a virtual memory address space 302, a page table 316, a set of PFDATs 306 and a set of physical page frames 312. In this example, it can be seen that multiple page sizes are supported. Specifically, a 64 KB page of data is stored at the virtual address $VM_0$. This page is mapped to the physical page P0 (314), as indicated by the PTE 304. Similarly, a 1 MB page of data is stored at virtual address $VM_1$. This page is mapped to the physical page P2 (318), according to the PTE 308. Likewise, a 16 KB page at the virtual address $VM_2$ is mapped to the physical page P1 (316), according to the PTE 310.

Note that each of the physical pages P0, P1 and P2 have one associated PFDAT (320, 322, and 324, respectively) regardless of the page size. Thus, in the conventional approach, one PFDAT 320 is used to represent a 64 KB page 314, one PFDAT 322 is used to represent a 16 KB page 316 and one PFDAT 324 is used to represent the 1 MB page 318.

In addition, it should be noted that the page table 316 comprises a single entry for each page that is mapped, regardless of the page size. That is, the single PTE 304 maps the 64 KB page 314, the PTE 308 maps the 1 MB page 318 and the PTE 310 maps the 16 KB page 316.

As stated, the above example represents the conventional approach for supporting memory pages of any size. That is, in conventional systems, there is a one-to-one relationship between the number of virtual pages, the number of page table entries, the number of physical page frames and the number of PFDATs.

Accordingly, conventional approaches for implementing multiple page sizes contemplate maintaining this one-to-one relationship. That is, regardless of the page size that is being supported, conventional approaches assume that a single PTE is used for each mapped memory page, and a single PFDAT is used for each physical memory page.

The problem with this approach, is that in order to provide multiple page size support, many components of the operating system need to be made aware of page sizes. For example, the file system, the I/O subsystem, and low level device subsystems need to be modified to be page size aware.

However, by not following this conventional approach, the present invention can be implemented in a typical operating system without having to modify major components. Further, for systems that run multiple processes, the present invention allows different views of data for different processes. That is, for example, one process may view a particular chunk of memory as a single large memory page, while another process may view the same chunk of physical memory as multiple smaller sized memory pages. As will be described below, this feature is desired to allow flexibility required to fully support multiple page sizes on multiprocessing machines. In addition, this feature makes it possible to transparently support existing applications. Such support may not be possible using the conventional approach as described above. As such, conventional approaches tend to limit the use of large page sizes and do not provide the flexibility as described herein.

Figure 4:
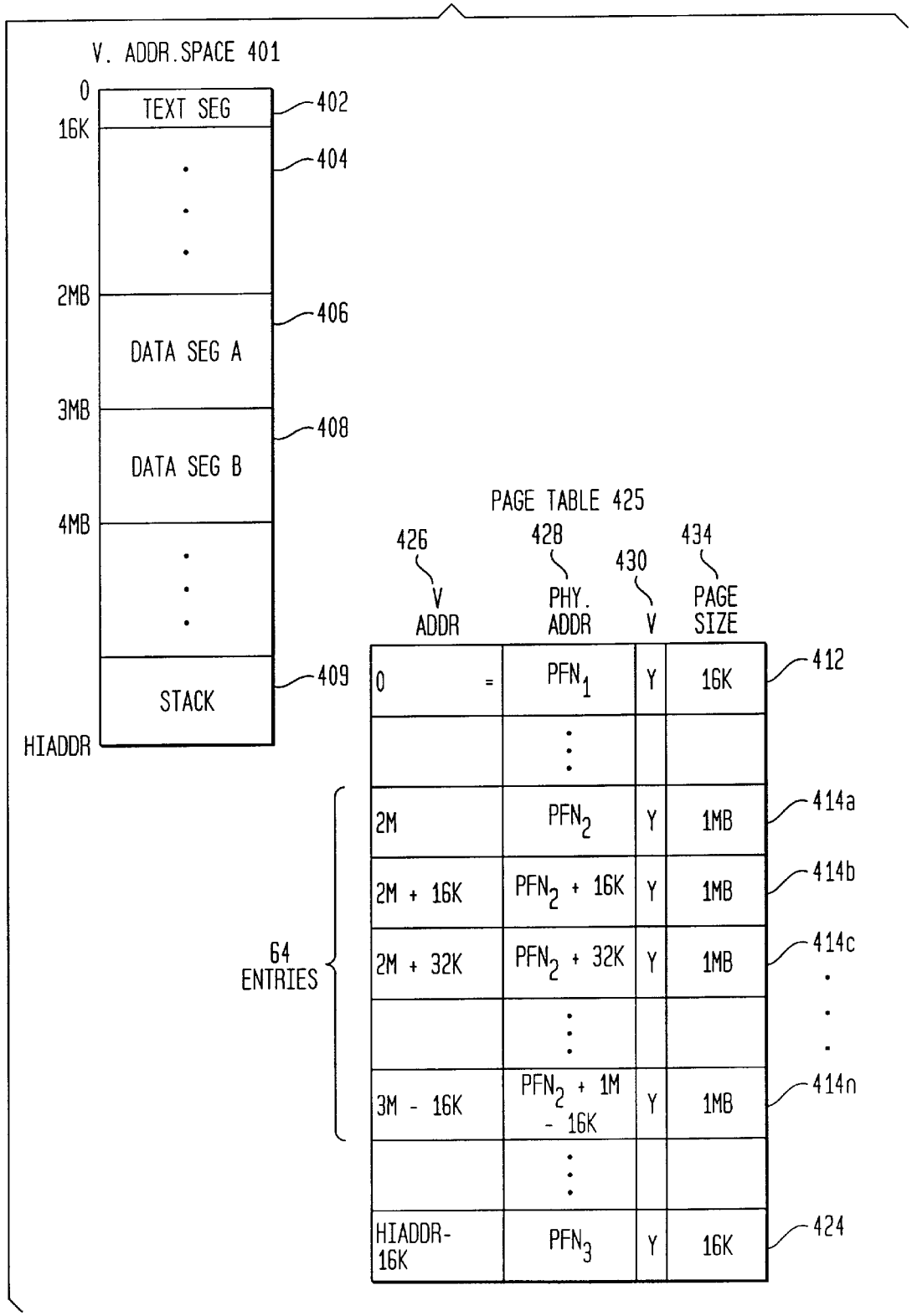
FIG. 4 is a block diagram depicting a virtual address space and a page table according to a preferred embodiment of the present invention.

FIG. 4 is a block diagram depicting a virtual address space and a page table according to a preferred embodiment of the present invention. In this example, the virtual address space comprises a text segment 402, two data segments 406 and 408 and a stack segment 409. The text segment 402 is associated with a 16 KB page size, the data segment 406 is associated with a 1 MB page size, and the stack segment 409 is associated with a 16 KB page size. That is, according to a preferred embodiment, memory is allocated for the text segment 402 as one 16 KB page. Similarly, memory is allocated for the data segment 406 as one 1 MB page and memory is allocated for the stack segment 409 as one 16 KB page. The data segment 408 will be used for different purposes in the examples below. For the purposes of the present example, the data segment 408 is not used.

As will be described below, in order to provide flexibly and transparency for large page size support without having to re-write major portions of an existing operating system, both PTEs and PFDATs are maintained at a base page size level. A base page size is defined as the smallest page size that is available for a particular embodiment of the present invention. Typical values for base page sizes are 4 KB and 16 KB. The actual base page size used for a particular embodiment depends on the needs and desires of each specific implementation of the present invention. In the examples used herein, it is assumed that a 16 KB base page size is defined.

Reference is now directed to the page table 425 in FIG. 4. The page table 425 comprises 4 fields that are relevant to this disclosure. A typical implementation will generally include additional fields in the page table. However, these additional fields are not discussed herein because they are not particularly relevant to the present invention. In this example, each PTE includes a virtual address 426, a physical address 428, a valid indicator bit 430 and a page size 434. The virtual address field 425 stores a virtual address that is used as an index to the page table. As previously described the virtual address 416 can be explicitly stored in each PTE or it can be indexed implicitly.

The physical address field 428 points to the page frame number (PFN) used to identify the physical page. The hardware valid bit 430 is generally used by the operating system to temporarily block processes from accessing memory associated with a PTE during specific intervals. For example, an operating system may invalidate a PTE, via the hardware validation bit 430, while data is being migrated from one physical page to another. While a PTE is invalid, a process that references the PTE typically enters the operating system kernel and is put to sleep until the PTE is once again validated, at which time the process is woken up. In this example, the PTE is validated when the migration is complete and the PTE is properly updated to reflect the new physical location (PFN) of the moved memory page. The page size field 434 is used to record the size of the memory page in each PTE.

Accordingly, the PTE 412 comprises a translation for a 16 KB memory page associated with the text segment 402 at the virtual address 0. The physical address of the memory page is PFN, as indicated by the physical address field 428. Because the PTE 412 represents a page that is coincident in size with the defined base page, namely 16 KB, only one PTE 412 is used to represent this memory page. This is to be contrasted with larger memory pages, such as the 1 MB page described below. Multiple PTEs are used to represent large memory page. The number of PTEs used in a preferred embodiment to represent large pages is equal to the large page size divided by the base page size.

The PTE 424 is also referencing a 16 KB memory page. This page is associated with the stack segment 409 at the virtual address HIADDR-16K. The physical address of the memory page id $PFN_3$ as indicated by the physical address field 428. Because this PTE 424 also represents a page that is coincident with the base page size, only one PTE 424 is used to represent this memory page.

In contrast, the 1 MB page at the virtual address 2 MB is represented by 64 PTEs 414a, 414b, 414c, . . . 414n (generally 414). 64 PTEs are used because it takes 64 base pages to make a 1 MB page. That is 16 KB*64=1 MB. Note that each PTE 414a–414n is recorded as a 1 MB page.

As shown by the PTE 414a, the physical address for the 1 MB page at the virtual address 2 MB 406 begins at the physical address $PFN_2$. Note that the other 63 entries 414b–414n also reference a page frame number. For example, PTE 414b references a physical page frame at the address $PFN_2$+16K. Similarly, PTE 414c references a physical page frame at the address of $PFN_2$+32K, and so on. The last PTE, namely, PTE 414n, references a physical address of $PFN_2$+1 M−16K.

The present invention maintains the use of base page size PTEs in order to facilitate methods such as upgrading and downgrading of memory page sizes and to remain compatible with methods and processes that are not large page size aware. Details of methods that can be used to upgrade and downgrade memory pages as well as a method to fault in large memory pages are described below. For the present, it is important to note that all PTEs are maintained at the base page size level.

Thus, for a base page size of 16K, one PTE is maintained for each mapped 16 KB memory page, 4 PTEs are maintained for each mapped 64 KB page, 16 PTEs are maintained for each mapped 256 KB page, 64 PTEs are maintained for each mapped 1 MB page, 256 PTEs are maintained for each mapped 4 MB page and 1024 PTEs are maintained for each mapped 16 MB page. Note that the values of supported page sizes and the value for the base page size used in the examples herein are for exemplary purposes only and should not be construed to limit the scope and breadth of the present invention. In fact, the present invention can be implemented using a variety of different values for the supported page sizes and a variety of different values for the base page size.

It is also important to note that one base page size PFDAT is maintained for each base page of physical memory, regardless of how the physical memory is divided up into variable sized pages. For example, 64 PFDATs (not shown) are maintained for the 1 MB page 406 that is stored at the physical address $PFN_2$. The first PFDAT represents a16 KB base page portion of the physical memory at the address $PFN_2$. The second PFDAT represents a second 16 KB portion of the physical memory at the address $PFN_2+16K$. The third PFDAT represents a third 16 KB portion of the physical memory at the address $PFN_2+32K$, and so on.

Accordingly, PTEs and PFDATs are maintained at the base page level in a preferred embodiment of the present invention. Another advantage gained by maintaining base page size PFDATs is that it allows for different processes to have different views of the same data. PFDATs are shared among different processes that share memory pages associated with the PFDAT. Accordingly, one process, such as the process associated with the page table 425, may view the data stored at $PFN_2$ as one large 1 MB memory page. At the same time, another process may view the data stored at $PFN_2$ as two 16 KB pages by nature of its associated PTEs (not shown). In this case the second process would have two PTEs, each defined as 16 KB pages that refer to the physical addresses, $PFN_2$ and $PFN_2+16K$, respectively.

Note that if the operating system were to set up 1 MB PFDAT representing a physical memory page at $PFN_2$ for the first process, it would be difficult or impossible to allow a second process to have a different view of the data stored at $PFN_2$. Thus, when one process needs a smaller page size, the operating system would be forced to downgrade those pages for all of the processes sharing the associated memory. This is not so with the present invention. By maintaining page size information in a page table associated with a particular process, and by maintaining separate PFDATs for each base page of memory, the present invention allows different processes to have different views of data.

As stated, TLBs are used to increase overall system performance by storing most recently used page table translations. Because TLBs are implemented in hardware, address translations are much faster than translations using page tables, which are generally implemented in software. An example of a typical TLB can be found in a MIPS R10000 microprocessor, manufactured by MIPS Technology, Inc. A MIPS R10000 TLB comprises 64 TLB entries, each having 2 subentries. The subentries are related to one another in that they map adjacent virtual pages of the same size. The TLB used in the examples below incorporate this restriction.

For example, a portion of a typical TLB is illustrated in FIG. 5. In FIG. 5, three entries are shown 510, 512 and 514. Each entry comprises 2 subentries. That is, entry 510 comprises the subentries 510a and 510b. Entry 512 comprises the subentries 512a and 512b. Entry 514 comprises subentries 514a and 514b. As stated, the subentries are related to one another in that they must comprise adjacent virtual memory pages of the same size. In addition, even aligned virtual memory addresses are placed in the top subentries (510a, 512a and 514a), and odd aligned virtual memory addresses are placed in the lower subentries (510b, 512b, and 514b).

In this example, the TLB 500 is populated with entries from the page table 425 as previously described. Each TLB entry 510, 512, and 514, currently holds a single subentry, 510a, 512a and 514b, as no adjacent pages are currently mapped in this example.

The fields that are relevant to the present invention are depicted in FIG. 5. Specifically, the virtual address 502, the physical address 503, the valid bit 504, the page size 506 and the process ID (PID) 508. Note that the PID 508 and the page size 506 must be the same for both subentries, such as the subentries 510a and 510b. A PID is necessary because the TLB is a shared system-wide resource. In this example the PID field indicates that all three TLB entries belong to the same process, namely, PID1.

Accordingly, the even aligned subentry 510a comprises a translation from the virtual address 0 to the physical address $PFN_1$. The valid bit indicates that the entry is valid and the page size is 16 KB. The odd aligned subentry 510b is marked as invalid 504 because no adjacent page is currently mapped. Note however that the only mapping that can be stored in the subentry 510b, is a 16K page at virtual address 16K (assuming the first subentry 510a is maintained). This TLB entry corresponds with the PTE 412.

The even aligned subentry 512a comprises a translation from the virtual address of 2 M to the physical address of $PFN_2$. The valid bit indicates that this entry is valid and the page size is 1 MB. Note that for this large page entry, both the virtual address and the physical address are on a boundary that coincides with the page size, in this case, a 1 MB boundary. The odd aligned subentry 512b is marked as invalid 504 because there is no adjacent page currently mapped. Note however that the only mapping that can be stored in the subentry 512b, is a 1 MB page at the virtual address 3 M (assuming the first subentry 512a is maintained). This TLB entry corresponds with the PTE 414a.

The odd aligned subentry 514b comprises a translation from the virtual address of HIADDR-16K to the physical address of $PFN_3$. The valid bit indicates that this entry is valid and the page size is 16 KB. The term 'HIADDR' is generally used to indicate the highest virtual address in the system and is typically an even aligned address. Accordingly, the address HIADDR-16K is an odd address and is placed in the lower subentry 514b. The even aligned subentry 514a is marked as invalid 504 because there is no adjacent page currently mapped. Note however that the only mapping that can be stored in the subentry 514a, is a 16 KB page at the virtual address HIADDR-32K (assuming the first subentry 514a is maintained). This TLB entry corresponds with the PTE 424.

It should be noted that if mapped data is moved (or "migrated") from a first page in memory to a second page in memory, any copies of page table entries that reference the memory page, including copies placed in a TLB, such as TLB 500, must be flushed or invalidated. PTEs that reference the first page are generally updated to reference the second page. If mapped data is deleted, page table entries that reference the page are typically invalidated.

It should be apparent that in order to support a TLB with variable page sizes, such as the TLB 500, a system and method must be provided to assure that the entry/subentry relationships in the TLB are maintained. For example, in one implementation, an operating system may restrict certain areas of virtual memory to particular page sizes. For example, referring to FIG. 4, an operating system may restrict the use of the virtual address space between 3 M and 4 M 408 to a 1 MB page size in order to assure the entry/subentry relationship in the TLB 500.

However, this type of implementation is quite limited. Application programs would be restricted to using particular predetermined page sizes for particular ranges of virtual address space.

Another alternative is to allow processes to run without any restriction as to how or where various sized memory pages are allocated. With this alternative the operating system assures that the TLB integrity is maintained by upgrading and downgrading memory pages as required by the present system state. This is the approach taken by the present invention. In this fashion, existing application programs can be executed without any modification whatsoever.

For example, suppose a particular process, such as a database application is associated with the virtual address space 401, the page table 425 and the TLB entries 500. Further suppose, the process attempts to allocate a 16 KB memory page somewhere within the virtual memory address range between 3 MB and 4 MB (see 408). As stated, a TLB entry associated with a 16 KB page cannot be stored in the TLB 500 subentry 512b because the other subentry 512a already contains a 1 MB page.

Accordingly, in a preferred embodiment, in order to accommodate the process and allow it to allocate a 16 KB page at the virtual address 3 M, the operating system downgrades the 1 MB memory page 406 into sixty four 16 KB pages.

In another example, suppose a process that maps a large memory page, such as the 1 MB memory page in TLB subentry 512a, subsequently unmaps a portion of the page. For example, a process that is not large page size aware, may free memory within the 1 MB large page. Accordingly, in order to accommodate the free memory request, the operating system again downgrades the 1 MB page into sixty four 16 KB pages. Then the operating system can unmap or free any one or more base pages within the 1 MB range.

It is also desired at times to upgrade pages into larger page sizes. For example, in order to increase the performance gained by fewer TLB misses, a process that is page size aware may request the operating system to upgrade smaller pages into a larger page. In a preferred embodiment, this is accomplished through the use of a function call, such as the upgrade function call, described below.

Examples of methods that can be used to downgrade and upgrade memory pages will now be described with reference to FIGS. 6 and 7, respectively. Note the downgrade method downgrades large memory pages into base page size pages. Similarly, the upgrade method upgrades base page size memory pages into larger memory pages. The use of base page sizes in these examples not intended to limit the scope and breadth of the present invention to upgrading and downgrading from and to base page sized memory pages. These methods are used for exemplary purposes only. In fact, using the principles disclosed herein, it would be apparent to those skilled in the relevant art(s), how to upgrade from or downgrade to any page size between and including the largest page size and the base page size.

FIGS. 6–12 are examples of methods that can be used to implement downgrading of memory pages, upgrading of memory pages, large page faulting, and page modify faulting, according to a preferred embodiment of the present invention. The pseudo code depicted in FIGS. 6–12 is self explanatory to persons skilled in the relevant art(s). However, included below is a detailed description of the functions depicted in FIGS. 6–12. Note that for each procedure, a set of parameters are included. These parameters are included to illustrate the variables, data structures, etc., that are used by the particular component. It is not intended to be suggested that these parameters are necessarily passed by the calling procedure, even though they may be described as being passed. In some instances these parameters are passed but in others they may be global and/or local variables that are accessible within the procedure.

The following is a brief description of symbols that are used in the pseudo code in FIGS. 6–12:

| | |
|---|---|
| "{" | indicates the BEGINNING of a loop, function, if statement, else statement, etc. |
| "}" | indicates the END of a loop, function, if statement, else statement, etc. |
| "=" | used to assign a value to a variable. |
| "==" | EQUAL TO |
| "!=" | NOT EQUAL TO |
| "\|\|" | Boolean OR |
| "&&" | Boolean AND |
| "&" | Bitwise AND |
| "~" | Bitwise complement |
| "A++" | A is assigned A + 1 |
| "for (A;B;C)" | FOR loop, where A is the initial value, B is the ending condition for the loop, and C depicts variables that are incremented during each iteration of the FOR loop. |
| "while(X)" | the while loop continues while X is TRUE |
| "if (X)" | the statements that appear between the "{" and "}" are executed if X is TRUE. If one statement only is associated with the if statement, the "{" and "}" are not used. |

A method that can be used to downgrade a large memory page into a plurality of base pages is depicted in FIG. 6. The 'pagesize_downgrade' method begins on line 602. In line 602, it is indicated that the method is passed a virtual address and the current page size of the large memory page. The virtual address in this example can be any address within the large memory page. For example, suppose the 1 MB page referenced in the TLB entry 512 is to be downgraded using this method. In this case, the virtual address that is passed can be any address between 2 M and 3 M. The passed virtual address is not necessarily aligned to the beginning of the large page (i.e. 2 M). Further the passed virtual address is not necessarily aligned at the beginning of a base page sized segment within the 1 MB page.

Accordingly, the method, in line 604, determines the even aligned virtual address by taking the bit complement of the virtual address ANDed with two times the current page size minus 1. This is a well known method to determine an even aligned address. Next, the number of base pages required to downgrade the large page is calculated in line 606.

In line 607 the first PTE associated with the large page size is retrieved. Next in the loop depicted by lines 609–610, each PTE corresponding with the virtual address space between 2 M and 4 M is invalidated. Preferably, this is accomplished by clearing the hardware invalidate bit (see field 430 in FIG. 4).

Recall that in a preferred embodiment, PTEs are maintained at the base page level. Thus, in this example, 64 PTEs exist for the 1 MB page. It is important to note that because the TLB entry/subentry restrictions must be maintained, the TLBs corresponding to both subentries in entry 512 must be invalidated. Thus, the loop in line 609 traverses not only the first 64 PTEs (associated with the virtual address space 2 M–3 M), but the next 64 PTEs (associated with the virtual address space 3 M–4 M) as well.

Next as line 611 indicates, the appropriate TLB entry is flushed. In this example, this is entry 512. Note that no other TLB entries are flushed. The loop beginning on line 612 updates each PTE with the new page size, namely the base page size in this example. Note that as lines 614–615 indicate, only those PTEs that were previously valid are validated (i.e. PTEs that contain a valid, or non-zero PFN).

A method that can be used to upgrade a plurality of base page sized memory pages into a large memory page is depicted in FIG. 7 In this method, all base page sized memory pages associated with a range of virtual addresses equal to the size of the large page are upgraded to the large page size. Specifically, the base pages are moved or migrated to another portion of memory suitable for the large memory page.

In addition, two large pages are allocated, an even virtually aligned large page and an odd virtually aligned large page. Large pages are allocated in pairs in order to comply with the entry/subentry requirements of the TLB 500, as described above.

The 'pagesize_upgrade_algorithm' method begins on line 702. In line 702, it is indicated that the method is passed a virtual address and the large page size. The large page size variable contains the size of the large page to which the base pages are being upgraded. On line 704, the even aligned address is calculated as described above. Also as described above, the number of base pages associated with the large page size is calculated on line 707. Next on line 708 the first PTE corresponding with the even aligned virtual address is retrieved.

Next in lines 714–717, the appropriate PTEs are invalidated. Specifically, the PTEs that are associated with both an even and odd aligned large page are invalidated. As stated, two large adjacent pages are to be allocated in order to assure that the entry/subentry requirements of the TLB 500 are met.

In lines 718–719 the two large memory pages are allocated. The allocate function calls return the first base page sized PFDAT associated with the even aligned memory page, and the first PFDAT associated with the odd aligned memory page. Next in line 720, the TLB entries associated with the current process are flushed.

In lines 724–736 the PTEs are scanned and data associated with PTEs comprising non-zero PFNs (i.e. PTEs that contained entries associated with valid base sized pages of data) are migrated to the new PFDATs. This performed for both the even and odd aligned large memory pages.

Specifically, in line 722 a new PFDAT variable is initialized with the first PFDAT of the even aligned large page. In line 723 a variable used to keep track of the number of PTEs scanned is initialized to zero. Next, in line 724, a loop is initiated to traverse a number of PTEs equal to twice the number of base pages. Twice the number of base pages are used so that the PTEs for both the even and odd aligned segments are traversed. Next as lines 726–728 indicate, if the PTE has a non-zero PFN (i.e. is associated with valid data), the current PFDAT associated with the PTE is retrieved and the data is migrated from the page associated with the current PFDAT to the page associated with the new PFDAT.

Line 730 checks to see if all of the PTEs associated with the even segment have been scanned. If not, the new PFDAT is incremented to the next base page sized PFDAT and the loop beginning on line 724 is repeated until all of the PTEs associated with the even segment have been scanned and the associated valid data has been migrated.

Once this is complete, the new PFDAT variable is initialized with the first PFDAT of the odd aligned large page (line 732) and the process is repeated until all of the PTEs associated with the odd segment have been scanned and the associated valid data has been migrated.

Next, as lines 737–740 indicate, the PTEs are again traversed and each entry is updated to reflect the new large page size (see field 434 in page table 425).

A method that can be used to fault in large memory pages will now be described with reference to FIGS. 8A–8C. This method is used for example, when a TLB miss occurs and there is no PTE associated with the referenced virtual address (or the PTE is invalid). The large page fault method then allocates a page of the appropriate page size, updates the necessary PTE(s) and drops an appropriate entry into the TLB.

The 'page_fault' process begins on line 802, where control immediately passes to line 804. In line 804 the process table entry associated with the current process is retrieved. The process table entry comprises data about the current process, such as the process ID, scheduling parameters, number of threads, virtual address space layout, etc. Next, in line 805 the virtual address is aligned to a base page size boundary, because the fault address can be any address that is not necessarily aligned. In line 807, the method determines whether the current fault policy directs the operating system to use large pages. Preferably, the policy can be set by an application programmer, an operating system, compiler, or other programming tool. If the page fault policy indicates that large pages are supported for this virtual address, the method calls a function to get the appropriate page size associated with the virtual address. The page size variable is then assigned that value in line 808.

Next, a function call to 'large_page_validate' is performed. This call is made to be sure that a large page can be faulted in for a given region of virtual address space. This function performs a number of checks on both the even and odd virtual address regions associated with a the pair of large pages. For example, both pages must have the same protections, cache attributes, etc. The 'large_page_validate' function is described below with reference to FIG. 11. If the large_page_validate function indicates that a large page cannot be faulted in, the page size is set to the base page size in line 810. Note that in this example, if a large page cannot be faulted in, the method defaults to the base page size. Alternatively, in another embodiment, a lower page size is selected and the function large page validate is called again. This process can be repeated until the largest possible page size is allowed.

In line 813, the memory object associated with the process table entry and the virtual address is retrieved. In line 814, the PTE associated with the virtual address is retrieved.

In Line 816, a function is called to get the offset into the memory object for the virtual address. In lines 819–820, a method referred to as 'large_page_prefault' is called. The large_page_prefault method is described in detail below with reference to FIG. 12. For the present, it is sufficient to state that the large prefault method returns either a success or a failure indicator. If large_page_prefault returns a success indicator, a large page can be faulted in. If a failure is returned, a large page cannot be faulted in. Accordingly, as indicated by line 824, the number of pages variable is set to 1 if large_page_prefault returns a failure. This indicates that only a single page of the base page size is to be faulted in.

Lines 825–887 (FIG. 8A and FIG. 8B) comprise a loop used to set up each of the base page sized PTEs for the large page that is faulted. Note that FIG. 8A and FIG. 8B comprises a series of IF and Else IF statements (See lines 829, 838, 856 and 875). Each statement is used to determine what actions need to be taken to set up each PTE for the large page. Once one of the IF or Else IF statements are true (and the associated code is executed), 'setup_page_table_entry' is called (lines 835, 855, 873, 885) to set up the PTE for the base size page segment of the large page. An example of a method that can be used for 'setup_page_table_entry' is described below with reference to FIG. 10.

In lines 826–828 the memory object's cache associated with the current page is searched to determine whether a physical page is already present in the system. This can occur for example, if another process is already using the current base sized page. If so, the page is already in memory and there is no need to reload the page into memory from an I/O device. Accordingly, if the search is successful, as indicated by lines 829–831, the PFDAT associated with the physical page is retrieved. The PTE is set up in line 836 and the loop 825 is repeated. Note that in lines 832 and 833 the method waits for the page to be ready, if for example, another process is performing I/O on the page.

If the search in line 826 is not successful, control passes to line 838 in FIG. 8B. In line 838 the method determines if the data corresponding to the memory object at the current offset is in a swap device. This can happen for example, if the memory pages has been swapped out to disk by the operating system due to low memory conditions.

If it is determined that the memory page is in a swap device, the method then checks to see whether the large_page_prefault function has already allocated a large page. An example of a method that can be used for the large_page_prefault function is described below with reference to FIG. 12. If large_page_prefault has already allocated a page, the PFDAT associated with that page is retrieved from the data structure pointer 'fault_info.pfdat'. The pointer is then incremented to point to the next PFDAT of the large page. (lines 842–844).

If large_page_prefault has not allocated a page, a new page is allocated and the PFDAT variable is set to the PFDAT associated with the newly allocated page (line 848). Next in line 850 the PFDAT is inserted into the appropriate offset position in the memory object cache. In line 852 the actual data is read from the swap device and inserted into the memory page associated with the PFDAT. In line 854 the page is marked ready. The PTE is set up in line 855 and the loop 825 is repeated.

The next condition is tested in line 856. In line 856 the method determines if the data corresponding with the memory object at the offset is in a disk file. If so, the method then checks to see whether the large_page_prefault function has already allocated a large page. If so, the PFDAT associated with that page is retrieved from the data structure pointer 'fault_info.pfdat'. The pointer is then incremented to point to the next PFDAT of the large page. (lines 859–862).

If large_page_prefault has not allocated a page, a new page is allocated and the PFDAT variable is set to the newly allocated page (line 867). Next in lines 868 the PFDAT is inserted into the appropriate offset position in the memory object cache. In line 870 the file system is directed to read data from the file. That data is stored in the memory page associated with the PFDAT. In line 872 the page is marked ready and the PTE is set up in line 873. The loop 825 is then repeated for the next PTE.

The last condition is tested in line 875 in FIG. 8C. In line 875, the method determines that because none of the previous conditions have been met, a new page needs to be set up. This occurs, for example, when a process needs to allocate a working memory buffer during execution. Again, the method checks to see whether the large_page_prefault function has already allocated a large page for this purpose. If so, the PFDAT associated with that page is retrieved from the data structure pointer 'fault_info.pfdat'. The pointer is then incremented to point to the next PFDAT of the large page. (lines 876–878). If large_page_prefault has not allocated a page, a new page is allocated and the PFDAT variable is set to the newly allocated page (line 880). Next in line 881 the PFDAT is inserted into the appropriate offset position in the memory object cache. In line 883 the page is initialized with all zeros. Next, in line 884 the page is marked ready and the PTE is set up in line 885. The loop 825 is then repeated for the next PTE.

When all of the PTEs associated with the large page are processed in the above manner, the PTEs are again traversed in the loop beginning on line 892. In this loop the valid bit for each PTE is set, as line 894 indicates. Finally, the TLB entry associated with the large page is dropped into the TLB.

An example of a method that can be used to implement a Page modify fault procedure is depicted in FIGS. 9A and 9B. In general this procedure is used by the operating system to keep track of modified pages associated with files. In one example, page modify fault is executed whenever a process attempts to modify a memory page associated with a file for the first time. Specifically, a modify bit in each PTE is initially set to false. Thereafter if a process attempts to change the contents of the memory page, this procedure is called so that the operating system can keep track of the modified pages. In this fashion, the operating system need only write pages that are modified back to the file.

In another example, page modify fault is executed when a process forks a child process. In this case, the parent and child initially share the same data. However, should either the child or the parent want its own copy of data to modify, a copy-on-write procedure is executed. In the copy-on-write procedure, a new page is copied for the process that is about to modify the page.

The 'page_modify_fault' method begins on line 902, where control immediately passes to line 904. In line 904 the process table entry associated with the current process is retrieved. The process table entry comprises data about the current process, such as the process ID, scheduling parameters, number of threads, virtual address space layout, etc. In line 905 the virtual address is aligned to a base page size boundary, because the fault address can be any address that is not necessarily aligned. In line 906 the PTE associated with the page_modify_fault is retrieved.

Next in lines 907–908, the method determines whether the current fault policy directs the operating system to use large pages. Preferably, the policy can be set by an application programmer, an operating system, compiler, or other programming tool. If the page fault policy indicates that large pages are supported for this virtual address, the method calls a function to get the appropriate page size associated with the virtual address. The page size variable is then assigned that value in line 909.

Next, in line 910 large_page_validate is called to be sure that a large page can be faulted in for a given region of virtual address space. This function performs a number of checks on both the even and odd virtual address regions associated with a the pair of large pages. For example, both pages must have the same protections, cache attributes, etc. The large_page_validate function is described below with reference to FIG. 11. If the large_page_validate function indicates that a large page cannot be faulted in, the page size is set to the base page size in line 911. Note that in this example, if a large page cannot be faulted in, the method defaults to the base page size. Alternatively, in another embodiment, a lower page size can be tried before defaulting to the base page size.

Control then passes to line 913. In line 913, the method determines if the page size is not equal to the base page size. If so, the method determines if the fault is the result of a copy-on-write memory segment that needs to be copied. If so, a copy of the large page is made. Specifically, in lines 916–917 an even and odd aligned address is calculated for the two adjacent large pages. Next in line 918 a large page is allocated. If the allocation fails, the pages are downgraded to pages of the base page size for both the even and odd aligned regions and the page size is set to the base page size (lines 920–922).

Referring now to FIG. 9B, in line 926, the number of base pages associated with the large page is calculated. Next, a loop to traverse the PTEs associated with the large memory page is started. In line 928, the method marks the PTE as dirty (modified), and the modify bit in the PTE is set to TRUE. Once the modify bit is set to TRUE, the page_modify_fault algorithm is no longer called if the process performs further modification to the page. This is so because the operating system already knows that the page needs to be written to disk at a later time.

Next in line 933 the method determines if a copy is needed. In some cases of a copy-on-write, a copy may not be needed. For example if a child process requesting the copy on write no longer exists by the time this line is executed, a copy is not needed. If a copy is needed, control passes to line 934, where the method determines a large page has been allocated.

If so, a new PFDAT variable is used to reference the large page PFDAT. Next, in line 936, the large page PFDAT variable is incremented to point to the next base page sized PFDAT for the next iteration of the loop 927. If a large page has not been allocated, a new PFDAT variable is used to reference an newly allocated base page in lines 938–939.

Next, in step 941, the current PFDAT associated with the current PTE is retrieved. In line 942, the data associated with the current PFDAT is copied into the page associated with the new PFDAT variable (from line 935 or line 938). In line 944 the new PFDAT is inserted into the memory object caches and setup_page_table_entry is called in line 945. The setup_page_table_entry function is described below with reference to FIG. 10.

Next in line 947, the modify bit in the currently traversed PTE is set to TRUE. As stated this indicates that the operating system must write the modified page to disk. Line 947 indicates that the loop beginning on line 927 is repeated until all PTEs have been traversed.

Finally the process ends with lines 949–950. In lines 949–950 the PTE associated with the large page is retrieved and an entry is dropped into the TLB.

FIG. 10 is an example of a method that can be used to set up a page table entry, as referenced above. The method begins on line 1005, where control immediately passes to line 1007. In line 1007 a PFN associated with the passed PFDAT is retrieved. Next in line 1008, the PTE is updated to point to the PFN retrieved from step 1007. Next in step 1009, the page size field in the PTE is updated to reflect the passed in page size. The process ends with step 1010, where a pointer to the PTE is placed in a reverse map field of the PFDAT.

Note that the reverse map field in a PFDAT, as referenced in line 1010, are used to identify a process or processes currently mapping the physical memory page associated with the PFDAT. In one implementation, the reverse map fields are used to point to particular page table entries (PTEs) associated with each process currently mapped to the PFDATs associated memory. For further information pertaining to reverse maps, refer to the commonly owned pending U.S. patent application entitled "System, Method and Computer Program Product for Reverse Mapping Memory to Referencing Data Structures", Attorney Docket No. 15-4-472, filed on Sep. 19, 1997 and which is hereby incorporated by reference in its entirety.

FIG. 11 depicts an example of a method that can be used to implement the large_page_validate function as referenced above. The method begins on line 1105, where a PTE, virtual address and page size is passed. Control then passes to line 1107. In lines 1107 and 1108 the even and odd aligned addresses associated with the large adjacent pages in the even and odd regions are calculated. Next in lines 1109–1112, the method determines whether the virtual address range associated with the adjacent large pages are in the same memory segment. If they are not, then a large page cannot be allocated and a failure indicator is returned in line 1112.

Next in line 1113, the method determines whether all of the based page size segments in the virtual address range have all been assigned the same protections and cache attributes. Note that a user is free to change the protections and cache attributes at a base page level. However, all of the base sized pages comprising a large page must have consistent protection and cache attributes. Thus, the method returns a failure indicator in line 1116, if this is found not to be the case.

Next in line 1117, the method determines whether the page fault policy is consistent among all of the base sized pages comprising the odd and even aligned large pages. Again, a user is generally free to change policies at a base page level. If the method determines that these are not consistent, a failure indicator is returned in line 1120.

If all of the previously described conditions are not true, then control passes to line 1121, where a success indicator is returned. The method ends as indicated by line 1122.

FIG. 12 is an example of a method that can be used to implement large_page_prefault as described above. In order to describe the purpose of this function the following example is presented. Suppose 2 processes map the same memory object, for example a memory object associated with a particular file. Further suppose that the first process had already faulted in the memory object in base page sizes. Thus, the second process cannot fault in the same memory object as a large page. Instead the second process can share the base pages that have already been faulted into memory.

Note that in this example, after the second process maps the memory object using base pages, it may then upgrade the base pages into a larger memory page, for example, using the upgrade procedure described above. Recall that when using the upgrade function, the base pages are migrated to an area in memory suitable for large memory pages.

The method begins on line 1202, where control immediately passes to line 1205. In steps 1206–1208, the even aligned virtual address, the odd aligned virtual address and the number of base page sized pages associated with the large page size are determined. As line 1208 indicates, all of the PTEs are scanned for the virtual address range associated with the odd and even aligned large contiguous pages.

Next as lines 1210–1213 indicate, the method determines whether a large page of page size bytes maps the even aligned address or the odd aligned address, or there are no pages mapping the entire address range. If either of these conditions are true, then a large page can be faulted in and lines 1214–1235 are executed. Otherwise, a large page cannot be mapped and control passes to line 1238. In line 1238, the method checks if the first condition as described is true, namely, a large page of page size bytes maps the even aligned address or the odd aligned address. If this is true, the method downgrades that large page to a set of base pages (line 1240). In either case, the method returns with a failure indicator, as shown in line 1241.

As stated, if a large page can be faulted in, lines 1214–1235 are executed. In line 1214 the method searches the memory object cache to see if any pages are mapped in the relevant range. Specifically the range in the memory object cache beginning at the memory object offset and ending at the memory object offset plus the number of pages (from line 1207). Next, as line 1217 indicates, if the data is all in the memory object cache and it is contiguous and properly aligned at the large page size, then a large page can be faulted in. Accordingly, a success indicator is returned as shown in line 1221.

In line 1222, the method determines if none of the data in the range is in cache. In this case, a large page can also be faulted in. However, a new PFDAT representing the large memory page must be allocated. This is performed on line 1224. However, the allocation is not successful, a large page cannot be faulted in and the method returns a failure indicator as shown by the goto fail statement on line 1226.

If the large page allocation is successful, a pointer to the PFDAT associated with the newly allocated page is stored in a data structure, namely fault_info data structure (line 1227). It should be recalled that this is the same data structure that has been previously referred to in the large page fault method, lines 819, 842, 860 and 877. After this pointer is set, the method returns a success indicator on line 1235.

In lines 1229–1230, the method determines whether all the data in the range in a swap device. If so, a large page is allocated in step 1231. Again, as indicated by lines 1233–1234, the method returns a failure indicator if the large page allocation fails. If the large page allocation is successful, a pointer to the PFDAT associated with the newly allocated page is stored in the pfault_info data structure (line 1234). The method then ends as indicated by line 1236.

Figure 13:
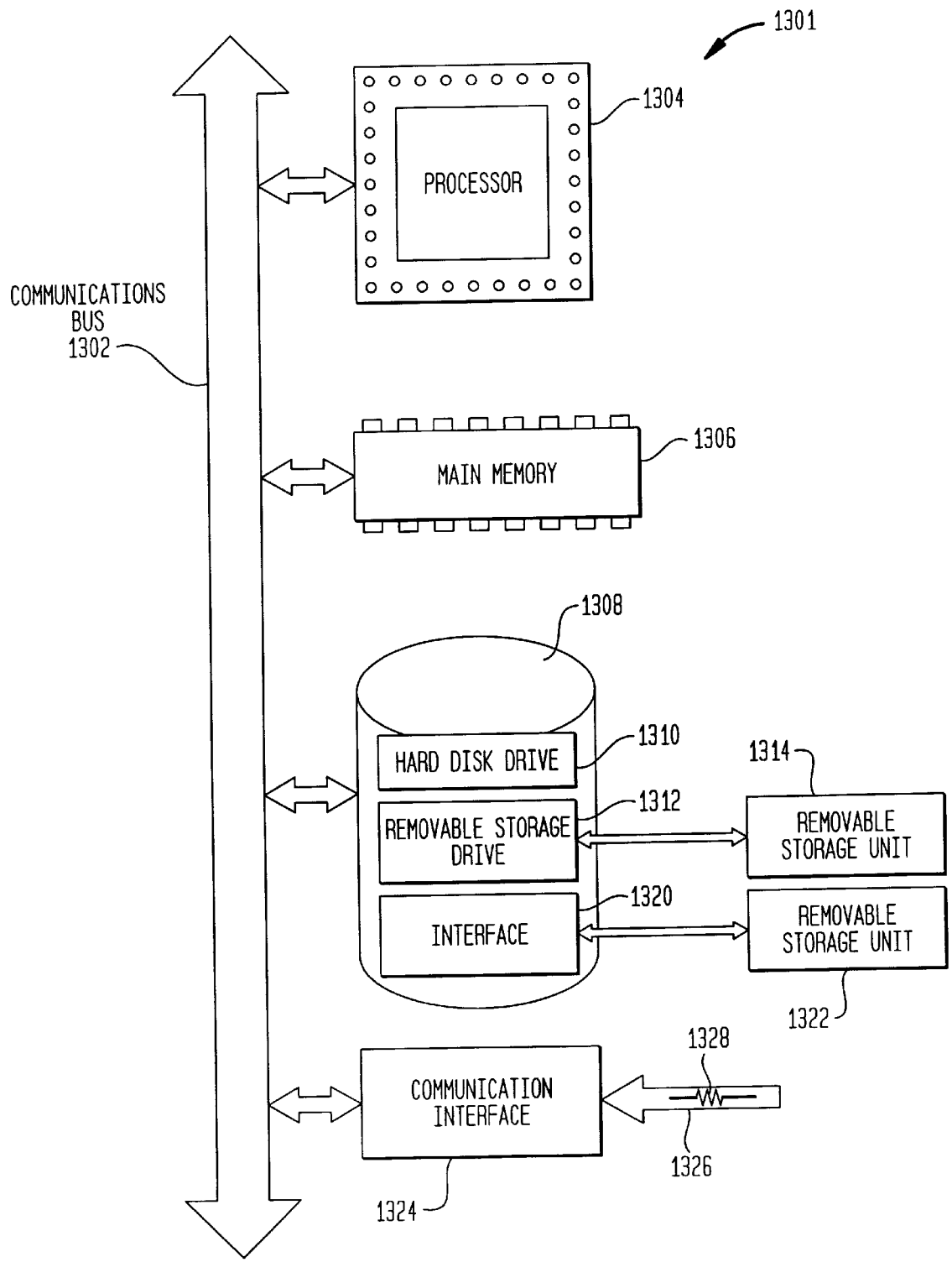
FIG. 13 is a block diagram of a computer that can be used to implement components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1301 is shown in FIG. 13. The computer system 1301 includes one or more processors, such as processor 1304. The processor 1304 is connected to a communication bus 1302. Various software embodiments are described in terms of this example computer system. After reading this description, it will become apparent to a person skilled in the relevant art how to implement the invention using other computer systems and/or computer architectures.

Computer system 1302 also includes a main memory 1306, preferably random access memory (RAM), and can also include a secondary memory 1308. The secondary memory 1308 can include, for example, a hard disk drive 1310 and/or a removable storage drive 1312, representing a floppy disk drive, a magnetic tape drive, an optical disk drive, etc. The removable storage drive 1312 reads from and/or writes to a removable storage unit 1314 in a well known manner. Removable storage unit 1314, represents a floppy disk, magnetic tape, optical disk, etc. which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples of such can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1301.

Computer system 1301 can also include a communications interface 1324. Communications interface 1324 allows software and data to be transferred between computer system 1301 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface via a channel 1328. This channel 828 carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1312, a hard disk installed in hard disk drive 1310, and signals 1326. These computer program products are means for providing software to computer system 1301.

Computer programs (also called computer control logic) are stored in main memory and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

In an embodiment where the invention is implemented using software, the software may be stored in a computer program product and loaded into computer system 1301 using removable storage drive 1312, hard drive 1310 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing virtual memory support for managing translation look aside buffers (TLBs) with multiple page size support for use in a computer system comprising the steps of:

defining a base page size for the computer system;

defining one or more defined large page sizes, each defined large page size being a multiple of said base page size;

maintaining a page frame data structure (PFDAT) for each portion of main memory of said base page size;

maintaining a page table entry (PTE) for each mapped portion of main memory of said base page size; and faulting in a large memory page, wherein said faulting in step comprises:

(i) determining an appropriate large page size;

(ii) verifying that a region of a virtual address space can accommodate a memory page of said appropriate large page size; and (iii) setting up a plurality of PTEs, wherein each of the plurality of PTEs is updated to point to a page frame number (PFN) and marked to reflect said appropriate size.

2. A method for providing virtual memory support for managing translation look aside buffers (TLBs) with multiple page size support for use in a computer system comprising the steps of:

defining a base page size for the computer system;

defining one or more defined large page sizes, each defined large page size being a multiple of said base page size;

maintaining a page frame data structure (PFDAT) for each portion of main memory of said base page size;

maintaining a page table entry (PTE) for each mapped portion of main memory of said base page size; and handling page modify faults on a large memory page, wherein a plurality of base page size portions of said large memory page are tracked for modification;

whereby only each of said plurality of base page size portions that are modified need to be written to file.

3. A system for providing virtual memory support for managing translation look aside buffers (TLBs) with multiple page size support for use in a computer system, comprising:

a base page definer that defines a base page size for the computer system;

a large page definer that defines one or more defined large page sizes, each defined large page size being a multiple of said base page size;

a data structure maintainer that maintains a page frame data structure (PFDAT) for each portion of main memory of said base page size;

a table entry maintainer that maintains a page table entry (PTE) for each mapped portion of main memory of said base page size; and a faulter that faults in a large memory page, wherein said faulter comprises:

(i) a determiner that determines an appropriate large page size;

(ii) a verifier that verifies that a region of a virtual address space can accommodate a memory page of said appropriate large page size; and (iii) a PTE setter that sets up a plurality of PTEs, wherein each of the plurality of PTEs is updated to point to a page frame number (PFN) and marked to reflect said appropriate size.

4. A computer program product comprising a computer useable medium having computer program logic stored therein, said computer program logic for providing virtual memory support for managing translation look aside buffers (TLBs) with multiple page size support for use in a computer system, comprising:

a base page definer that enables the computer to define a base page size for the computer system;

a large page definer that enables the computer to define one or more defined large page sizes, each defined large page size being a multiple of said base page size;

a data structure maintainer that enables the computer to maintain a page frame data structure (PFDAT) for each portion of main memory of said base page size;

a table entry maintainer that enables the computer to maintain a page table entry (PTE) for each mapped portion of main memory of said base page size; and a faulter that enables the computer to fault in a large memory page, wherein said faulter comprises:

(i) a determiner that enables the computer to determine an appropriate large page size;

(ii) a verifier that enables the computer to verify that a region of a virtual address space can accommodate a memory page of said appropriate large page size; and (iii) a PTE setter that enables the computer to set up a plurality of PTEs, wherein each of the plurality of PTEs is updated to point to a page frame number (PFN) and marked to reflect said appropriate size.

5. A system for providing virtual memory support for managing translation look aside buffers (TLBs) with multiple page size support for use in a computer system, comprising:

a base page definer that defines a base page size for the computer system;

a large page definer that defines one or more defined large page sizes, each defined large page size being a multiple of said base page size;

a data structure maintainer that maintains a page frame data structure (PFDAT) for each portion of main memory of said base page size;

a table entry maintainer that maintains a page table entry (PTE) for each mapped portion of main memory of said base page size; and a fault handler that handles page modify faults on a large memory page, wherein a plurality of base page size portions of said large memory page are tracked for modification;

whereby only each of said plurality of base page size portions that are modified need to be written to file.

6. A computer program product comprising a computer useable medium having computer program logic stored therein, said computer program logic for providing virtual memory support for managing translation look aside buffers (TLBs) with multiple page size support for use in a computer system, comprising:

- a base page definer that enables the computer to define a base page size for the computer system;
- a large page definer that enables the computer to define one or more defined large page sizes, each defined large page size being a multiple of said base page size;
- a data structure maintainer that enables the computer to maintain a page frame data structure (PFDAT) for each portion of main memory of said base page size;
- a table entry maintainer that enables the computer to maintain a page table entry (PTE) for each mapped portion of main memory of said base page size; and
- fault handler that enables the computer to handle page modify faults on a large memory page, wherein a plurality of base page size portions of said large memory page are tracked for modification;
- whereby only each of said plurality of base page size portions that are modified need to be written to file.

* * * * *